Figure 4:
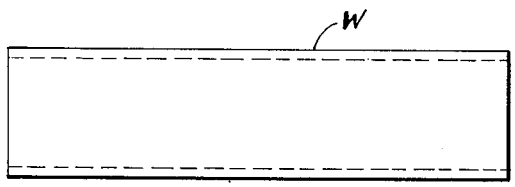

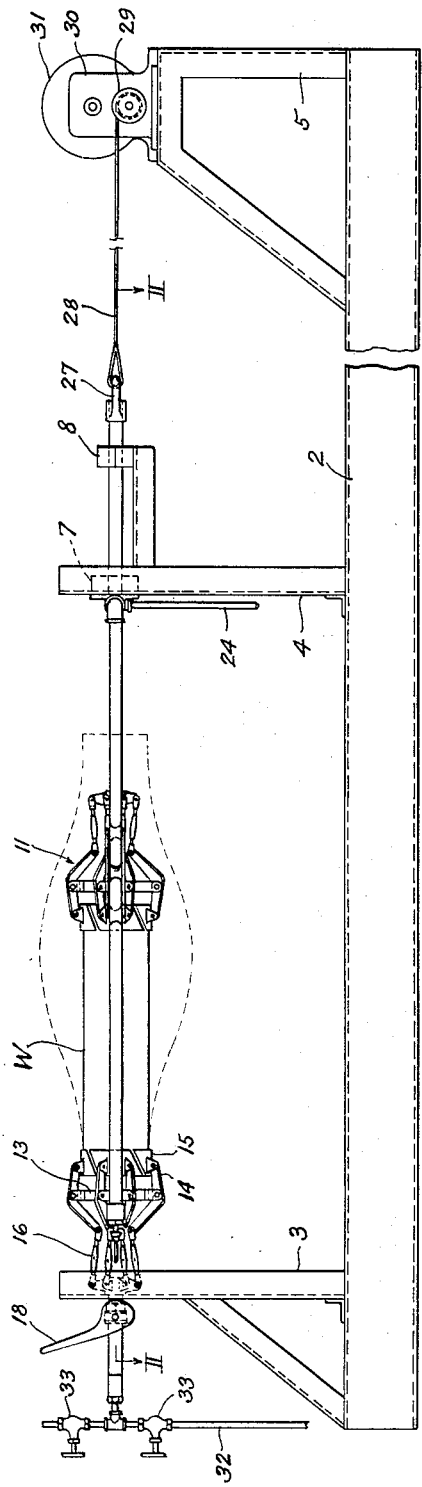
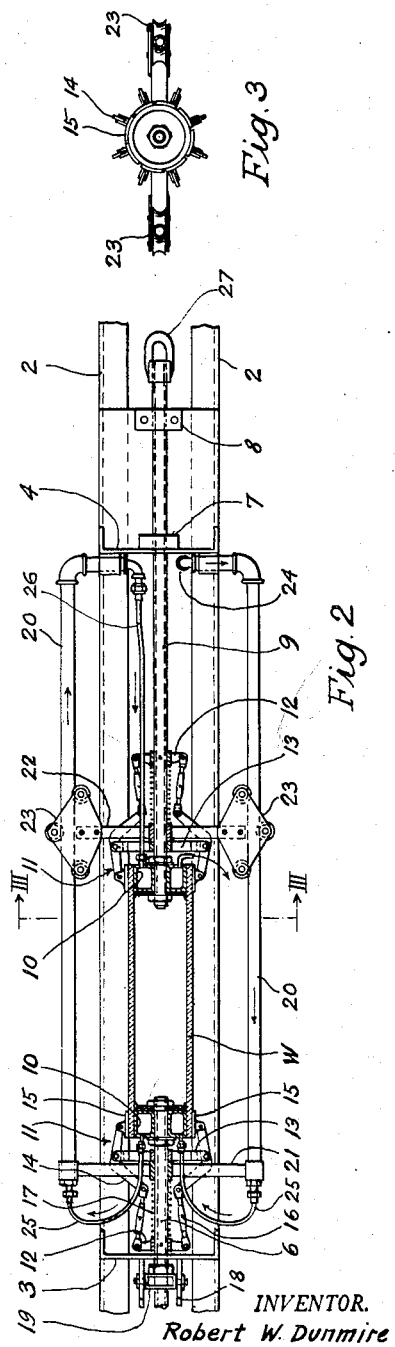

March 12, 1957   R. W. DUNMIRE   2,784,457
METHOD OF FORMING MULTI-AXIALLY STRETCHED ENCLOSURES
Filed June 12, 1953   2 Sheets-Sheet 2

INVENTOR.
Robert W. Dunmire
BY
*A. H. Oldham*
ATTORNEY

United States Patent Office 2,784,457
Patented Mar. 12, 1957

2,784,457

METHOD OF FORMING MULTI-AXIALLY STRETCHED ENCLOSURES

Robert W. Dunmire, North Canton, Ohio, assignor to Goodyear Aircraft Corporation, Akron, Ohio, a corporation of Delaware Application June 12, 1953, Serial No. 361,265

4 Claims. (Cl. 18—56)

This invention relates to methods of forming transparent enclosures, such as airplane canopies and the like, of thermoplastic material and in particular to enclosures which are shatter-resistant.

Heretofore, it has been known to make airplane canopies of transparent thermoplastic material, such as polymethyl methacrylate, shatter-resistant by assembling two or more sheets into a laminate similar to laminated glass sheets. However, such construction is not only very heavy, but also high in cost, so that a better way of making shatter-resistant canopies was desirable.

It has also been known that certain thermoplastic materials, such as polymethyl methacrylate, are elastic in heated condition and that sheets of such materials, if sufficiently and uniformly stretched in two directions substantially at right angle to each other, will become shatter-resistant and also more craze resistant after cooling. However, in order to obtain the desired shatter resistance, the required amount of stretch is not the same for all materials but may vary within wide limits, as between about 50% to 130%, depending on the particular material used. On the other hand, the result is substantially the same whether the material is first stretched in one direction and, then, in the other direction, or, simultaneously in both directions. With shatter resistance not being a requirement the percentage of stretch, of course, can be reduced. Attempts have been made to apply this knowledge in the making of compound-curved canopies and similar articles, however, so far with little success. This is understandable, because it is extremely difficult to uniformly stretch the sheet material in two directions without becoming wrinkled and the clamps holding it have the tendency to slip from the hot sheet when under tension and with uneven stretching causing the material to tear. Another difficulty is the forming of the stretched sheet in a jig or mold whereby the material stretches more in the center than towards its edges resulting in a structurally inefficient part because of non-uniform thickness, as well as producing a non-uniform degree by shatter resistance. Besides, the stretching and forming apparatus for flat sheets is very complicated and high in cost.

It is the general object of the invention to avoid and overcome the foregoing and other difficulties of and objections to prior art practices by stretching and forming a compound-curved shatter-resistant aircraft canopy, and the like, from a suitable length of tubing of transparent thermoplastic material having elastic properties in hot condition, whereby the tube is stretched longitudinally and circumferentially, if necessary against a jig, for controlling the final shape of the canopy.

Another object of the invention is to additionally control the longitudinal contour of the canopy by pre-expanding one or both ends of a work tube to larger diameters.

Another object of the invention is to obtain substantially uniform thickness of the stretched tube portion which is to form a canopy.

Another object of the invention is to form simultaneously two or more canopies from a single tube, depending on the cross sectional shape of the canopy.

Another object of the invention is to make aircraft canopies, in general, in a simpler and more efficient way.

The aforesaid objects of the invention and other objects which will become apparent as the description proceeds are achieved by making shatter-resistant transparent canopies not from a flat sheet of suitable thermoplastic material, such as polymethyl methacrylate, but from a tube, either cast or fabricated from such sheet material. This tube may be cylindrical in its entire length or pre-expanded circumferentially at one or both ends, in order to make it more suitable in stretching and forming the tube into a canopy of desired shape. In addition, the forming of a canopy may be also controlled by a jig having substantially the edge contours of the canopy by placing the jig in proper position relative to the radially expanding tube, which in its last expanding stage will be marked off along the edges of the jig. This method makes it also possible that two or more canopies might be obtainable from one tube by applying two or more jigs against the expanding tube, depending on the cross-sectional shape of the canopy. Using tubular stock as starting material for making a compound-curved canopy, and the like, has the great advantage over using a flat sheet that the edge portions of the tube to be expanded into a canopy are not stretched at all, but held in a firm all around grip. Such an arrangement, being very simple and compact, has considerable possibilities in varying the canopy form and permits easy cooling of the gripped portion which must remain hard to prevent deformation causing slipping of the clamps therefrom and tearing of the material. Also, the tube material thus held is stretched without wrinkles and reduced to a substantially uniform thickness of staisfactory optical qualities at the portion of the tube to be used as canopy.

Figure 5:
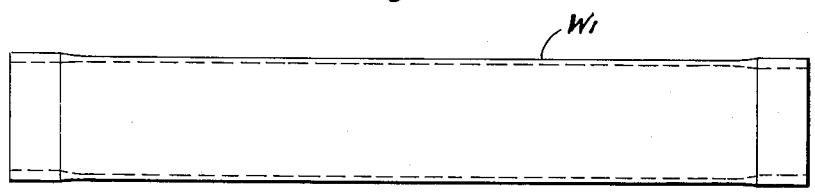
Figure 6:
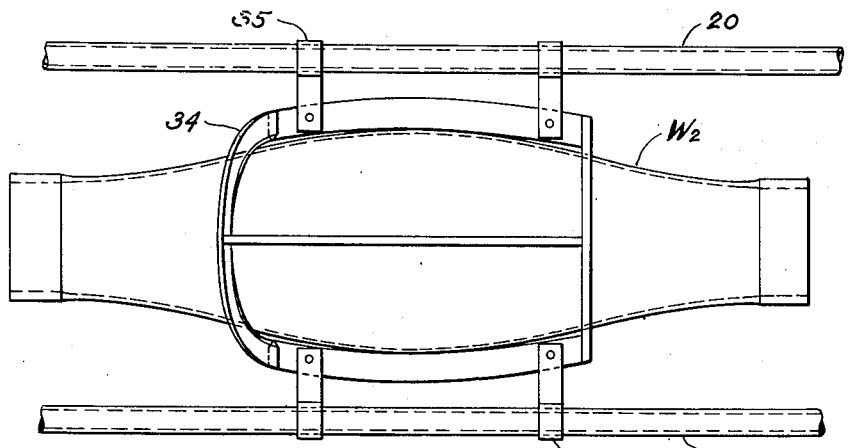
Figure 7:
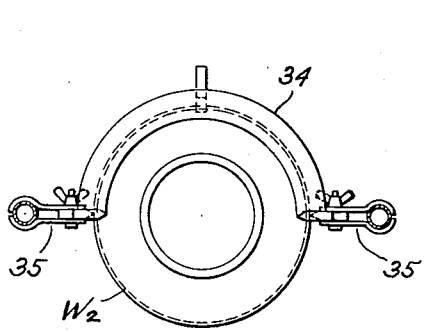
Figure 8:
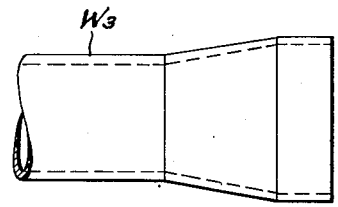

For a better understanding of the invention reference should be had to the accompanying drawings, wherein Fig. 1 is a side view of one embodiment of an apparatus for forming canopies according to the invention, Fig. 2 is a fragmentary horizontal cross-sectional view taken on line II—II of Fig. 1, Fig. 3 is a cross-sectional view taken on line III—III of Fig. 2, Fig. 4 is a side view of a tubular work piece to be stretched into a canopy, Fig. 5 is a similar view of the tube after being stretched longitudinally, Fig. 6 is a plan view of the tube, shown in Fig. 5, after being expanded circumferentially, with a forming jig placed in position for completing circumferential expansion of the tube against the jig edges, Fig. 7 is a vertical end view of Fig. 6, and Fig. 8 is a fragmentary side view of a tubular work piece having pre-expanded ends.

With specific reference to the form of the invention illustrated in the drawings, Figs. 1 to 3, the numeral 1 indicates, in general, a supporting frame of an apparatus for carrying out the methods of making shatter-resistant, as well as, non-shatter-resistant canopies and the like. Frame 1 consists of two base girders 2 and of vertical supports 3, 4 and 5. Through support 3 passes axially slightly movable a tubular shaft 6 and in line therewith is mounted on support 4 in bearings 7 and 8 a shaft 9. To the near ends of the shafts 6 and 9 are fastened plugs 10 and spider clamps 11, indicated as a whole, are mounted thereon in cooperation with the plugs 10. The clamp 11 consists of an outer spider bracket 12, fixed to its shaft, an inner larger spider bracket 13, loose on its shaft, levers 14 fulcrumed on the brackets closed herein but is to be accorded the full scope of the claims so as to embrace any and all equivalent devices.

Having described our invention, what we claim as new and desire to secure by Letters Patent is:

1. A mechanical action for artificial limb joints comprising a relatively stationary member and a ratchet segment rotatably mounted on the member, a lever rotatably mounted on the member with the rotational axis adjacent to the circumference of the ratchet segment, a locking bar on said lever having opposite curved faces positioned generally perpendicular to the radius from the rotational axis of the lever, said segment having a series of spaced generally radially extending bar receiving notches with faces complementary to the respective faces of the bar when in bar receiving position, said rotational axis of the lever being at a point adjacent a line tangent to an arc about the axis of said segment struck through the centers of the faces of said notch.

2. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite faces positioned generally perpendicular to the radius from the rotational axis of the lever and the faces, said segment being subject to a rotative load and having a series of spaced generally radially extending bar receiving notches with faces complementary to the respective faces of the bar when in bar receiving position, said rotational axis of the lever being within an angular distance of a line tangent to an arc about the axis of said segment struck through the centers of the faces of said notch such that the component of the force resulting from application of a rotative load tending to disengage the bar from the notch is less than the frictional force on the respective contacting faces.

3. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces positioned generally perpendicular to the radius from the rotational axis of the lever and the faces, said segment having a series of spaced generally radially extending bar receiving notches with arcuate faces complementary to the respective faces of the bar when at bar receiving position, said rotational axis of the lever being within an angular distance of five degrees inside of a line tangent to an arc about the axis of said segment struck through the centers of the faces of said notch.

4. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces of radius of curvature determined by the distance between the rotational axis of the lever and the respective face, said segment having a series of spaced generally radially extending bar receiving notches with arcuate faces complementary to the respective faces of the bar, said rotational axis of the lever being at a point within an angular distance of 15 degrees on either side of a line tangent to an arc centered at the axis of said segment and through the centers of the faces of a notch in bar engaging position, the faces of said notches having positions wherein said last faces are in engagement substantially throughout their areas with the respective faces of the bar when in bar engaging position.

5. A mechanical action for artificial limb joints comprising a pair of members wherein one member is adapted for attachment to a natural limb, parallel plates on one of the members, the other of said members comprising a tubular sleeve rotatably mounted on said plates providing thereby an articulating joint for said action, a ratchet segment fixed on said sleeve having a series of spaced generally radially extending notches, a lever pivotally mounted at a center of rotation on said one member, a locking bar fixed transversely on the lever, and an alternator connected between the lever and one of said members adapted to releasably hold said bar out of notch engagement position, said bar having opposite notch contacting faces curved in the same general direction and said notches having opposite curved bar engaging faces complementary to and adapted to engage the respective faces of the bar when in bar engaging position.

6. A mechanical action for artificial limb joints comprising a relatively stationary member adapted for attachment to a natural limb, parallel plates on said member and a tubular sleeve rotatably mounted on said plates providing thereby an articulating joint for said action, a ratchet segment fixed on said sleeve having a series of spaced generally radially extending notches, a lever pivotally mounted at a center of rotation on said member, a locking bar fixed transversely on the lever, a spring on said member normally urging said bar toward a notch engagement position, and an alternator connected between said member and the lever adapted to releasably hold said bar out of notch engagement position, said bar having opposite notch contacting faces of arcuate form and of radius determined by the distance between the respective face and said center of rotation of the lever, said notches having opposite bar engaging faces of arcuate form complementary to and adapted to engage the respective faces of the bar when in bar engaging position.

7. A ratchet resistant mechanical action for artificial limb joints comprising a base, a ratchet segment rotatably mounted on the base and a locking bar having a pivotal mounting on said base, said locking bar having opposite segment-engaging faces curved in the same general direction about the axis of said pivotal mounting, said segment having a series of peripheral bar receiving notches with opposite faces respectively complementary to the faces on said bar.

References Cited in the file of this patent

UNITED STATES PATENTS 2,637,042     Threewit                May 5, 1953

FOREIGN PATENTS 303,664     Germany                Feb. 11, 1918

4. That method of making a shatter-resistant, transparent, oblong, multi-curved enclosure of substantially half round cross-section, such as airplane canopies and the like, including the steps of preparing a tubular work piece of transparent thermoplastic material elastic in hot condition, gripping and sealing the ends of the work piece over their entire circumference, heating the work piece to soften it, concurrently cooling the gripped ends of the work piece to prevent deformation thereof, stretching the work piece about equally in both longitudinal and circumferential directions in amounts between about 50% and about 130% and cooling the work piece while held in the stretched condition, and trimming the work piece to provide an airplane canopy or the like.

References Cited in the file of this patent

UNITED STATES PATENTS

| | | |
|---|---|---|
| 2,172,426 | Weingand et al. | Sept. 12, 1939 |
| 2,307,817 | Austin | Jan. 12, 1943 |
| 2,494,273 | Wigal | Jan. 10, 1950 |